: 2,928,862
Patented Mar. 15, 1960

2,928,862
PESTICIDAL PHOSPHORUS ESTERS

Joe R. Willard and John F. Henahan, Middleport, N.Y., assignors to Food Machinery and Chemical Corporation, New York, N.Y., a corporation of Delaware No Drawing. Application July 16, 1956
Serial No. 597,888

2 Claims. (Cl. 260—461)

This invention relates to novel pesticidal compositions, and particularly to compositions which are useful as insecticides, acaricides and ovicides. More specifically, it has been discovered that compounds of the class of phosphoric esters which includes the bis(S-(dialkoxyphosphinyl)mercapto)alkanes and bis(S-(dialkoxyphosphinothioyl)mercapto)alkanes possess unique pesticidal activity, in that they function as effective ingredients in insecticidal compositions, acaricidal compositions and ovicidal compositions. The subject compounds have the general formula

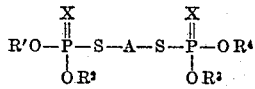

wherein X is oxygen or sulfur, A is a divalent hydrocarbon or substituted hydrocarbon radical of at least two carbon atoms connecting the adjacent sulfur atoms, and $R'$, $R^2$, $R^3$ and $R^4$ are organic radicals.

Compounds of this general type have reportedly been prepared wherein the —A— group in the foregoing structural formula is derived from an alkylene glycol. It has now been discovered that a large variety of esters of the type described, including many which were heretofore unavailable, may be prepared from a dihalide having the general formula

Y—A—Z wherein Y and Z may be chlorine or bromine. In addition to alkylene of two or more carbon atoms, such as ethylene, butylene, pentylene, hexylene and the like, the A group of said dihalide may be a bifunctional radical derived from an olefinically or acetylenically unsaturated hydrocarbon, such as butene, pentyne, and the like, or a substituted hydrocarbon radical, containing groups such as chloro, bromo, nitro, hydroxy, alkoxy, alkyl, aryl, acyl, acyloxy, carbalkoxy, carbamido and the like.

In preparing the compounds of this invention, the dihalide is condensed with a metallic salt of a thio- or dithiophosphoric acid, of the formula

such as the alkali metal and alkaline earth salts and the ammonium and silver salts, generally in the presence of a solvent. The radicals $R'$ and $R^2$ may be hydrocarbon radicals such as alkyl, cycloalkyl or aryl, for example, or they may be substituted hydrocarbons containing such substituents as chloro, bromo, alkoxy, nitro, and the like. Generally $R^3$ and $R^4$ correspond to $R'$ and $R^2$, although they may be different if the reaction is carried out in two stages.

In the preferred process of this invention, two molar equivalents of the appropriate phosphorothioic or -dithioic acid is dissolved in a solvent such as ethanol or dioxane, and a solution of the metal hydroxide is added until the pH is about seven. A 25–40% solution of potassium hydroxide in ethanol is a convenient reagent. A preformed salt of the phosphorus acid may also be used. To the neutral solution is added one molar equivalent of the desired dihalide, and the mixture is heated until the reaction is complete. This generally requires about 3–14 hours under reflux. The product is separated and tested for pesticidal activity.

The following examples illustrate the preparation of typical compounds. There are of course many modifications of these techniques which may be successfully employed by those skilled in the art, and which do not depart from the spirit and scope of the invention.

EXAMPLE 1

1,4-bis(S-(di-2-butoxyphosphinothioyl)mercapto)-butene-2

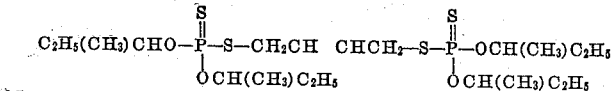

Two molar equivalents of O,O-di-2-butyl hydrogen phosphorodithioate were dissolved in sufficient ethanol to give a four molar solution. Twenty percent ethanolic potassium hydroxide was added slowly, the temperature maintained below 50° during the addition, until the pH of the solution was approximately 7.0. To the neutral solution was added 1 molar equivalent of 1,4-dichlorobutene-2 and the mixture was heated under reflux for two hours. The precipitated solid was isolated on a filter and the filtrate was concentrated under vacuum. The residue after removing the solvent was diluted with ether, the solution washed with two volumes of water and the ethereal layer dried. The dried solution was concentrated under vacuum to give 0.76 molar equivalent of an orange liquid having an $n_{25}D$ 1.5178. Analysis.—Calcd. for $C_{20}H_{42}O_4P_2S_4$: P, 11.56. Found: P, 11.20.

EXAMPLE 2

1,2-bis(S-(diethoxyphosphinyl)mercapto)ethane

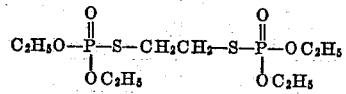

To 2 molar equivalents of an ethanolic solution (four molar) of sodium O,O-diethylphosphorothiolate, prepared by reaction of elemental sulfur with O,O-diethyl phosphite according to the procedure of Fiszer et al. (Chem. Abstracts 49, 3786 (1955)), was added one mloar equivalent of 1,2-dibromoethane. The reaction mixture was heated under reflux for six hours and the product recovered as described in Example 1, to give 0.50 molar equivalent of dark red liquid having an $n_{25}D$ 1.4848. Analysis.—Calcd. for $C_{10}H_{24}O_6P_2S_2$: P, 16.91. Found: P, 17.00.

EXAMPLE 3

2,3-bis(S-(diethoxyphosphinothioyl)mercapto)-1,3-diphenylpropanone-1

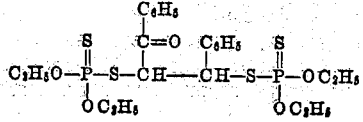

A solution of potassium O,O-diethylphosphorodithioate was prepared as described in Example 1. To two molar equivalents of this solution was added one molar equivalent of 2,3-dibromo-1,3-diphenylpropanone-1 and the solution was heated under reflux for three hours. The reaction mixture was treated as described in Example 1 to give 0.96 molar equivalent of a reddish-brown liquid having an $n_{25}D$ 1.5497. *Analysis.*—Calcd. for $C_{23}H_{32}O_5P_2S_4$: P, 10.70. Found: P, 10.40.

EXAMPLE 4

*1,2-bis(S-(diethoxyphosphinothioyl)mercapto)-3-chloropropane*

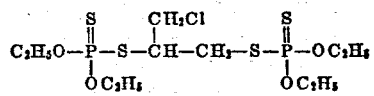

Two molar equivalents of potassium O,O-diethylphosphorodithioate was reacted with one molar equivalent of 1-chloro-2,3-dibromopropane in the manner described in Example 1. From the reaction mixture was obtained 0.90 molar equivalent of a red-orange liquid having an $n_{25}D$ 1.5333. *Analysis.*—Calcd. for $C_{11}H_{25}ClO_4P_2S_4$: P, 13.86. Found: P, 13.18.

In Table 1 below are described a number of compounds of this invention which have not heretofore been characterized. Those compounds may be prepared by procedures similar to those of the foregoing examples.

secticidal coating compositions, and as resdiues. In general, they can be applied by methods commonly used for control or eradication of insects, mites and the like. Thus, these compositions may be formulated with solvents, diluents, and carrier media, adhesives, spreading, wetting and emulsifying agents and other ingredients.

A typical formulation used in evaluating the toxicants of this invention is a wettable powder containing 25% of the candidate pesticide, 72% Attaclay (fuller's earth) and 3% of an alkyl aryl polyether alcohol as wetting agent. This wettable powder is applied to plant foliage as an aqueous suspension, by spraying. The treated plants were infested and observations made at intervals to determine the efficacy of the compounds as toxicants.

Insects used in the testing included the German roach (*Blattela germanica* (L.)), Mexican bean beetle (*Epilachnia varivestis* Muls.), southern armyworm (*Prodenia eridania* (Cram.)), pea aphid (*Macrosiphum pisi* (Kltb.)) and two-spotted mite (*Tetranychus bimaculatus* Harvey).

Table 2 below represents the results of screening tests of representative compounds of this invention. A number of these compounds exhibited residual, slow acting or ovicidal activity.

To measure ovicidal activity, horticultural bean plants were infested with adult two-spotted mites. A period of four to five hours was allowed for the deposition of eggs. The ovicidal materials were then applied to the

TABLE 1

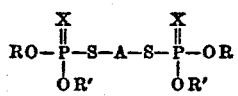

| Compound | | | | $n_{25}D$ | Analysis | |
|---|---|---|---|---|---|---|
| R | R' | X | A | | Theory | Found |
| Methyl | Methyl | S | —CH₂CH₂— | 1.5233 | | |
| Ethyl | Ethyl | S | —CH₂CH₂— | 1.5330 | P—15.55 | P—15.42 |
| Do | do | O | —CH₂CH₂— | 1.4848 | P—16.91 | P—17.00 |
| n-Propyl | n-Propyl | S | —CH₂CH₂— | 1.5233 | | |
| 2-Propyl | 2-Propyl | S | —CH₂CH₂— | 1.5110 | P—13.63 | P—12.90 |
| n-Butyl | n-Butyl | S | —CH₂CH₂— | 1.5138 | S—25.11 | S—23.97 |
| Cyclohexyl | Cyclohexyl | S | —CH₂CH₂— | 1.5249 | P—10.08 | P— 9.85 |
| Phenyl | Phenyl | S | —CH₂CH₂— | 1.5842 | P—10.41 | P—11.01 |
| Ethyl | do | S | —CH₂CH₂— | 1.5350 | P—12.51 | P—12.89 |
| Ethyl/2-Propyl(3/1) | Ethyl/2-Propyl(3/1) | S | —CH₂CH₂— | 1.5298 | | |
| Ethyl/2-Propyl(1/1) | Ethyl/2-Propyl(1/1) | S | —CH₂CH₂— | 1.5245 | P—14.63 | P—14.97 |
| Ethyl | Ethyl | S | —CH₂CH₂CH₂— | 1.5312 | P—15.04 | P—15.76 |
| Do | do | S | —CH₂CH₂CH₂CH₂— | 1.5288 | P—14.54 | P—15.25 |
| Methyl | Methyl | S | —CH₂CH=CHCH₂— | 1.5162 | | |
| Ethyl | Ethyl | S | —CH₂CH=CHCH₂— | 1.5450 | P—14.59 | P—14.66 |
| Do | do | O | —CH₂CH=CHCH₂— | 1.4972 | P—15.79 | P—15.40 |
| n-Propyl | n-Propyl | S | —CH₂CH=CHCH₂— | 1.5330 | | |
| 2-Propyl | 2-Propyl | S | —CH₂CH=CHCH₂— | 1.5218 | | |
| n-Butyl | n-Butyl | S | —CH₂CH=CHCH₂— | 1.5180 | S—23.94 | S—24.75 |
| Isobutyl | Isobutyl | S | —CH₂CH=CHCH₂— | 1.5158 | | |
| 2-Butyl | 2-Butyl | S | —CH₂CH=CHCH₂— | 1.5178 | P—11.56 | P—11.20 |
| Cyclohexyl | Cyclohexyl | S | —CH₂CH=CHCH₂— | 1.5270 | | |
| Phenyl | Phenyl | S | —CH₂CH=CHCH₂— | 1.5900 | P—10.04 | P—10.68 |
| Ethyl | Ethyl | S | —CH₂C≡CCH₂— | 1.5478 | P—14.66 | P—15.99 |
| Do | do | S | —CH(CH₃)—CH₂— | 1.5218 | | |
| Do | do | S | —C(CH₃)₂—CH₂— | 1.5055 | P—14.52 | P—13.70 |
| Do | do | S | —CH(COC₆H₅)—CH—(C₆H₅)— | 1.5878 | P—10.70 | P—10.40 |
| Do | do | S | —CHCl—CH₂— | 1.5150 | P—14.30 | P—14.70 |
| Do | do | S | —CH(CH₂Cl)—CH₂— | 1.5333 | P—13.86 | P—14.70 |
| Do | do | S | —CH(C₆H₅)—CH₂— | 1.5578 | | |
| Do | do | S | —CH(OC₂H₅)—CH₂— | 1.5228 | | |
| Do | do | S | —CH₂—CH(OH)—CH₂— | 1.5390 | P—14.49 | P—14.50 |
| Do | do | S | —CH₂—C(O)—CH₂— | 1.5372 | P—14.35 | P—14.59 |
| 4-Chlorophenyl | 4-Chlorophenyl | S | —CH₂CH₂— | 1.5805 | P— 8.45 | P— 8.33 |

The compounds of this invention were evaluated for pesticidal activity. It was found that all were not equivalent in activity, but that some were superior as insecticides, some as acaricides and some as ovicides, and that some showed systemic activity as well. Some of the compounds in this group showed an unusually broad range of activity characterized by high toxicity.

The pesticidal compositions may be formulated as aqueous emulsions, as dry or wettable powders, as solutions, or in any other suitable vehicle. The compositions can be utilized as sprays, as dusts, as aerosol mixtures, ineggs by dipping the leaves into aqueous suspensions of wettable powder formulations of these materials one day after infestation. A plus (+) sign in Table 2 indicates significant ovicidal activity.

To measure residual activity, horticultural bean plants were dipped in aqueous suspensions of wettable powder formulations of the test materials and the plants allowed to dry. After seven and twelve days plants are infested, and counts taken of the percent killed. A plus (+) sign in Table 2 indicates significant residual activity.

TABLE 2.—PESTICIDAL ACTIVITY OF REPRESENTATIVE COMPOUNDS $$RO-\underset{\underset{OR'}{|}}{\overset{\overset{X}{\|}}{P}}-S-A-S-\underset{\underset{OR'}{|}}{\overset{\overset{X}{\|}}{P}}-OR$$

| Compound | | | | Percent Kill at 1,250 p.p.m. | | | | | | | |
|---|---|---|---|---|---|---|---|---|---|---|---|
| R | R' | X | A | Two-spotted Mites | | | | German Roach | Mexican Bean Bettle | | Pea Aphid |
| | | | | Adults | Nymphs | Ova | Residual | | Adults | Residual | |
| Ethyl | Ethyl | S | —CH₂CH₂— | 100 | 100 | — | + | 85 | 95 | + | 15 |
| Methyl | Methyl | S | —CH₂CH₂— | 100 | 100 | — | — | 0 | 0 | — | 0 |
| Ethyl | Phenyl | S | —CH₂CH₂— | 100 | 100 | + | + | 30 | 100 | + | 25 |
| Do | Ethyl | O | —CH₂CH₂— | 97 | 95 | — | + | 95 | 100 | + | 100 |
| Do | ---do--- | S | —CH₂CH=CHCH₂— | 100 | 100 | — | + | 0 | 65 | + | 0 |
| Do | ---do--- | S | —CHClCH₂— | 100 | 75 | — | + | 40 | 5 | — | 0 |
| Do | ---do--- | S | —CH(CH₃)CH₂— | 100 | 100 | — | + | 0 | 35 | — | 5 |
| Do | ---do--- | S | —CH(OC₂H₅)CH₂— | 100 | 100 | — | + | 0 | 20 | — | 0 |
| Do | ---do--- | S | —CH₂CH(OH)CH₂— | 100 | 100 | — | + | ------ | 0 | — | 25 |
| Do | ---do--- | S | —CH₂C≡CCH₂— | 100 | 100 | — | + | 40 | 100 | + | 10 |

Pursuant to the requirements of the patent statutes, the principal of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A pesticidal composition comprising a toxic concentration of 1,2-bis(S-(diethoxyphosphinothioyl)mercapto)ethane of the formula $$C_2H_5O-\underset{\underset{OC_2H_5}{|}}{\overset{\overset{S}{\|}}{P}}-S-CH_2CH_2-S-\underset{\underset{OC_2H_5}{|}}{\overset{\overset{S}{\|}}{P}}-OC_2H_5$$

and an inert pesticidal adjuvant as carrier therefor.

2. As a new composition of matter, a compound having the general formula $$C_2H_5O-\underset{\underset{OC_2H_5}{|}}{\overset{\overset{S}{\|}}{P}}-S-CH_2-CH_2-S-\underset{\underset{OC_2H_5}{|}}{\overset{\overset{S}{\|}}{P}}-OC_2H_5$$

References Cited in the file of this patent

UNITED STATES PATENTS

| | | |
|---|---|---|
| Re. 20,411 | Romieux et al. | June 15, 1937 |
| 2,266,514 | Romieux et al. | Dec. 16, 1941 |
| 2,494,126 | Hoegberg | Jan. 10, 1950 |
| 2,494,283 | Cassaday et al. | June 10, 1950 |
| 2,586,655 | Hook et al. | Feb. 19, 1952 |
| 2,589,675 | Cook et al. | Mar. 18, 1952 |
| 2,596,076 | Hook et al. | May 6, 1952 |
| 2,632,767 | Smith et al. | Mar. 24, 1953 |
| 2,736,737 | Morris | Feb. 28, 1956 |
| 2,786,009 | Pianfetti et al. | Mar. 19, 1957 |

Dedication 2,928,862.—*Joe R. Willard* and *John F. Henahan*, Middleport, N.Y. PESTI-
CIDAL PHOSPHORUS ESTERS. Patent dated Mar. 15, 1960.
Dedication filed Nov. 4, 1971, by the assignee, *FMC Corporation*.
Hereby dedicates to the Public the remaining term of said patent.
[*Official Gazette August 1, 1972.*]